Dec. 21, 1965 R. D. ERICKSON 3,225,352

METHOD FOR RECORDING

Original Filed April 11, 1962 3 Sheets-Sheet 1

INVENTOR.
ROGER D. ERICKSON
BY Arthur H. Swanson
ATTORNEY.

INVENTOR.
ROGER D. ERICKSON
BY Arthur H. Swanson
ATTORNEY.

INVENTOR.
ROGER D. ERICKSON
BY Arthur H. Swanson
ATTORNEY.

United States Patent Office 3,225,352
Patented Dec. 21, 1965

3,225,352
METHOD FOR RECORDING
Roger D. Erickson, Littleton, Colo., assignor to Honeywell Inc., a corporation of Delaware
Original application Apr. 11, 1962, Ser. No. 186,750. Divided and this application Jan. 20, 1964, Ser. No. 344,157
1 Claim. (Cl. 346—1)

Specification of Roger D. Erickson for useful improvements in Method for Recording, this application is a divisional application of a copending application by Roger D. Erickson, assignor to Minneapolis-Honeywell Regulator Company, Serial No. 186,750, filed on April 11, 1962, and subject matter disclosed but not claimed in this application is shown and claimed in the aforesaid copending application of Roger D. Erickson.

The present invention relates to improvements in recording methods of the type disclosed in the Heiland Patent 2,580,427 for producing a record in the form of an image or trace which is immediately visible and usable and is accomplished in full view of the operator thereby providing rapid access to the recorded information.

An object of the present invention is to provide an improved recording method having particular utility in multi-channel-oscillography and providing rapid writing, short access time, and good contrast and stability. By the term "access time" is meant the time interval between the exposure of the recording paper to the recording radiation beam and the presentation of the record or trace for visual observation.

Oscillographic recorders which produce immediately visible traces of rapidly varying electrical phenomena under observation are known in the prior art. One such form of recording oscillograph is described in the aforementioned Heiland patent. Another form of such a recording oscillograph is disclosed in the application for United States patent, filed on September 8, 1958 by R. S. Kampf and bearing Serial No. 759,675, now Patent 3,066,-299 of November 27, 1962. Such oscillographs are used in scientific, military and medical fields. Frequently, an essential requirement of such apparatus is rapid access to the recorded information.

The invention described in Patent 2,580,427 is unique in the realization that the use of a recording radiation beam, principally in the invisible portion of the spectrum, when matched with a recording paper coated with an emulsion primarily responsive to such radiations, permits recording of multiple high, as well as low frequency phenomena, which recording becomes immediately visible in ordinary room light. The unavoidable delay encountered in the prior art of wet-process development in a darkroom is eliminated.

The use of such recording paper, referred to in the art as print-out recording paper, gives an immediate image or trace corresponding to the deflections of the recording beam of radiation when the recording beam and recording paper are moving comparatively slowly. At higher writing speeds or higher paper transport speeds, a "latent" image or trace is recorded, as in developing-out recording papers requiring wet-process development. This latent recorded image can be "latensified" and thereby made to appear, by exposing it to room light. The time of such secondary exposure required to make the trace visible varies with the speed of writing and paper transport speeds, but ordinarily is about a minute. The appearance of the latent image through secondary exposure is known in the art as "latensification."

For many applications, a latensification time delay of one minute, although extremely short when compared to the time required previously for wet-process development, cannot be tolerated if the full potential of oscillographic recorders of the type disclosed in Patent 2,580,247 and in Patent 3,066,299 aforementioned, is to be realized. In the applications involving testing and experimenting, for example, the oscillograph is used for monitoring purposes. Often corrective action must be taken within a second or two if a significant change occurs in one of the monitored variables. A one-minute latensification time cannot be tolerated under such conditions. Moreover, if the paper transport speed is at the rate of several feet per second, an awkward paper-handling problem tends to result if all of the resulting length of paper has to be latensified by exposure to the room lighting for a period as long as a minute before the trace becomes visible.

A specific object of the present invention is to provide an improvement in the latensification process which results in rapid trace access, that is, trace appearance many times faster than with conventional oscillograph arrangements, as described above, and with improved contrast between trace and background. With forced latensification achieved according to the present invention, a highly visible trace is produced within a fraction of a second at record travel speeds in excess of eight inches per second and at any frequency resolvable at the speed, or envelope studies if in excess of the resolvable frequency.

A more specific object of the present invention is to provide a method which effects such forced latensification of the recording paper without fogging in a convenient manner involving a combination of infra-red and ultra-violet radiations to each of which the recording paper or material is particularly sensitive. The use of infra-red radiation or heat and low intensity ultra-violet light to desensitize or inactivate the paper and permit forced latensification in combination with higher intensity ultra-violet radiation provides an added advantage of better contrast between trace and background. It has been found that maximum trace contrasts are obtained with as high a paper temperature as is practically feasible, in cooperation with combinations of visible and ultra-violet radiations produced by cool white fluorescent lamps and black light fluorescent lamps.

Thus in accordance with the present invention, latensification is produced by radiations to which the recording material is particularly sensitive. By first exposing the recording paper or material for a short time to a low intensity state of radiation, while the paper is heated to a temperature in the range from 130° F. to 350° F. as it passes over a hot platen, it has been found that a high intensity latensifying radiation defining the same wavelengths may be used with a minimum of fogging. By way of example and not limitation, radiation between 3000 A. and 4000 A., in the range of wavelengths to which the paper is particularly sensitive, is effective in cooperation with infra-red radiation or heat in the temperature range specified in desensitizing the background of the recording paper or material. The exposure of the paper to such radiation desensitizes the background or areas of the paper on which no latent images have been recorded. The exposure times required for desensitization range from a fraction of a second to several seconds depending on the degree of desensitization desired. Following the low intensity exposure, the paper desirably can be exposed to high intensity radiation between 3000 A. and 4000 A. The high intensity radiation latensifies the latent image very rapidly and produces a minimum darkening of the background because the background has been desensitized. In the prior art, the use only of high intensity radiations between 3000 A. and 4000 A. for latensification has not been permissible because such radiations would also produce excessive darkening or fogging of the background.

A better understanding of the present invention may be had from the following detailed description when read in connection with the accompanying drawings in which.

Figure 1:
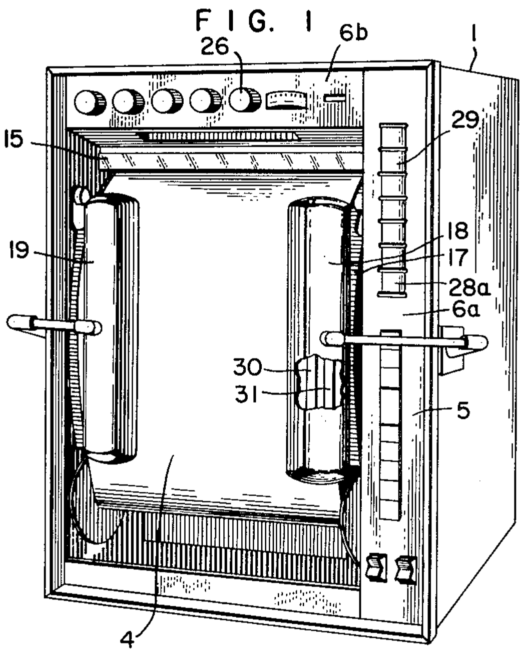
FIG. 1 is an external view of a rapid access oscillograph embodying the present invention.
Figure 2:
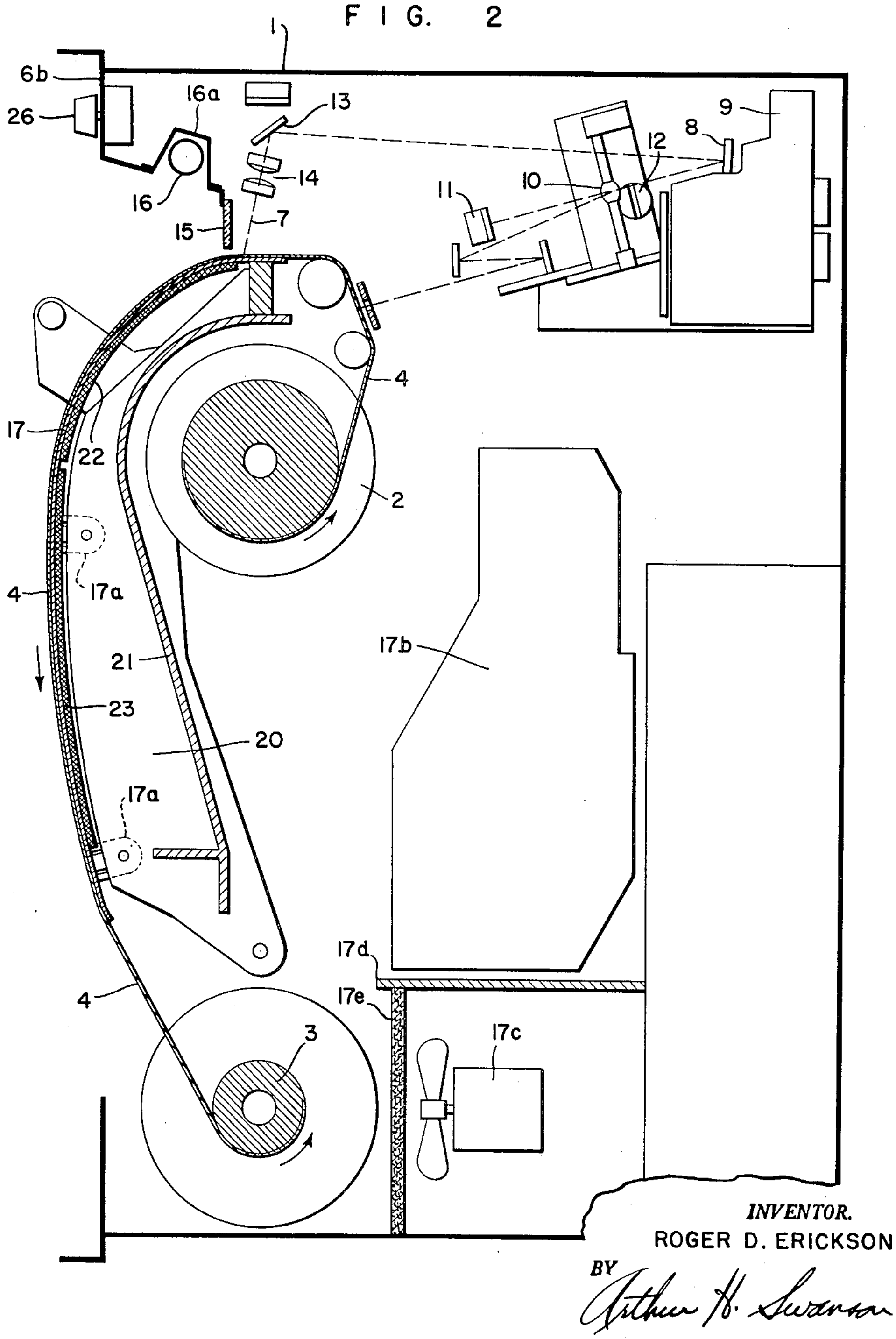
FIG. 2 is a diagrammatic or schematic view in vertical cross-section of the oscillograph of FIG. 1, illustrating the construction of the hot platen.

The oscillographic recorder illustrated in FIGS. 1 and 2 includes an outer case 1 containing a supply reel 2 and a take-up reel 3 for the roll of sensitive recording paper or material 4. It will be apparent that in some cases the take-up reel 3 may not be necessary or desirable, and in such cases the take-up reel 3 may be dispensed with and the recording paper may be permitted to spill out over the table or panel on which the oscillograph is mounted and onto the floor.

An electric motor driven, push-button actuated, multi-speed transmission, not shown, actuates the reels 2 and 3 and is controlled by push-button devices indicated generally at 5, and located on the vertical front panel **6*a* of the oscillograph. As shown, a horizontal panel 6*b* is also provided at the top of the oscillograph. Mounted on the panels 6*a* and 6*b* are conventional oscillograph push-button or other control devices for turning the electric power on and off, for energizing the recording lamp, for actuating the multi-speed transmission to drive the recording paper, for indicating the amount of recording paper remaining on supply reel 2**, and for varying such factors as frequency of time line printing, intensity of the recording beam or spot, and intensity of grid lines. These control devices are associated with the oscillograph without further description since they form no part of the present invention.

In a recording-plane region between the reels, as seen in FIG. 2, the recording paper 4 is exposed to a recording beam 7 of radiation coming from the respective galvanometers, only one of which, here designated 8, is illustrated. Galvanometer 8 is shown mounted in a galvanometer magnet bank 9 which in practice ordinarily contains 12 galvanometers. It will be understood that any arbitrary number of such galvanometers may be provided; for example, there are three magnet banks containing a total of 36 galvanometers in one apparatus embodiment of the specific oscillograph on which the instant invention is drawn. Each such galvanometer has a small mirror, not shown, deflectable by the associated galvanometer movement, that will deflect the recording beam of radiation 7 from a source 10 to that portion of the sensitive recording paper 4 that is at the time at the recording-plane region between the reels 2 and 3.

The source 10 of radiation is a super-high-pressure mercury-vapor lamp enclosed in a quartz envelope, and is operable to emit a beam of high intensity ultra-violet radiation. An example of such a lamp is the Osram lamp having a 0.012 inch diameter arc, which lamp is manufactured by the Osram Company in West Germany and is identified as their Model HBO–109. The beam of radiant energy from lamp 10 is concentrated by a collector lens, not shown, and is directed to a light-control mirror 11. The mirror 11 reflects the recording beam to a spot intensity control comprised by a filter 12 through the galvanometer lens to the mirror of the galvanometer 8. The galvanometer mirror reflects the radiant energy back through the galvanometer lens to a recording mirror 13, and through a recording lens 14 onto the recording paper 4 on the recording plane.

The oscillographic recorder embodiment illustrated is open at the front thereby permitting direct access to the recording paper 4 for loading, latensifying, and viewing. At the upper portion of the front of the recorder, immediately adjacent the recording lens 14, is an amber-colored viewing window 15 for enabling the operator to observe the high-energy spots made by the beams of the ultra-violet radiant energy from the galvanometer mirrors during the positioning and recording operations. The window 15 protects the operator against direct exposure to the high energy ultra-violet recording beams and prevents pre-latensification and desensitization of the record before the recording plane. Electric lamps 18 and 19 which are adjustably side-mounted at the front of the oscillograph provide latensifying radiation for the record traces, as further explained herein. Additionally, it has been found that the use of a lamp 16 which emits yellow light radiation in the range from 5500 A. to 5800 A. facilitates observation of the traces as they appear. A reflector **16*a* desirably is associated with lamp 16**.

Figure 4:
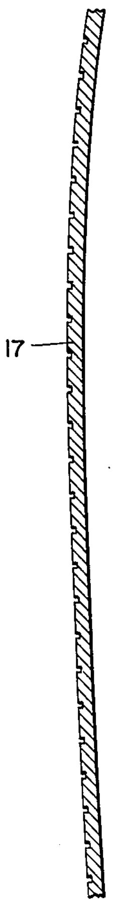
FIG. 4 is a side view of a portion of the hot platen taken along the line 4—4 of FIG. 3.

In the illustrated embodiment utilizing the method of the present invention, heat from an electrically heated platen 17, having a heat transfer surface over which the recording paper slides in good heat transfer relation, and visible and ultra-violet radiations produced by electric lamps 18 and 19 cooperate to latensify the latent images on the recording paper as the latter is drawn or transported downwardly at the front of the oscillograph. In an operative embodiment of the apparatus, the platen 17 is made of an aluminum plate curved and pre-formed with lateral grooves or slots, as shown in FIGS. 1 and 4, and has the following approximate dimensions: 14½ inches in length, 13 inches in width and ⅛ inch in thickness. The slots extend transversely across the entire width of the platen and are provided, as explained hereinafter, to remove gaseous layers which tend to adhere to the surface of the recording material adjacent the platen, thereby to insure good thermal contact between the recording paper and the platen.

The platen 17 is mounted by means of suitably thin tabs **17*a* at the front of the oscillograph, between a pair of curved brackets of which one designated 20 is seen in FIG. 2. The use of the thin tabs 17*a*** for mounting the platen effects a further desirable reduction in the transfer of heat from the platen to the other oscillograph components.

In order to protect the recording paper on the supply and take-up reels and also the other oscillographic components from the heat of the platen, a heat shield or plate 21 desirably is provided. This heat shield 21 may comprise a metallic plate extending between and rigid with the brackets 20 and having an area substantially coextensive with the platen at the front of the oscillograph. A highly reflecting surface may be provided on the side of platen 17 facing the plate 21, if desired, in order to minimize the radiation of heat from the platen to the plate 21. A similar reflective aluminum or other surface may also be attached to the surface of the shield 21 which faces the platen 17 to reflect heat away from the shield 21.

With this mounting arrangement, the platen 17 is supported in spaced relation with the remainder of the oscillograph thereby to minimize the flow of heat to the oscillograph from the platen. Additionally, a cooling fan, schematically illustrated at **17*c*** and shown embodied in a housing 17*d* having a suitable filter 17*c* at the side adjacent reel 3, is arranged to create a suitable cooling flow of air between the shield 21 and the platen 17. This over-all construction not only protects the recording paper on the supply reel 2 from undesired heat which would tend to desensitize it, and also protects other components of the oscillograph against undesired heat, but also permits heating of the platen 17 to the desired temperature with the addition of a smaller quantity of heat than would otherwise be possible, thereby permitting faster heating and cooling of the platen, and avoiding unnecessary dissipation of heat into the surrounding space in which the oscillograph is installed. This avoidance of unnecessary heat dissipation is important particularly when the oscillograph is installed in an air conditioned space having limited or already over-taxed air-conditioning facilities.

A housing designated by the reference numeral 17*b* includes a power transmission mechanism, not shown, for driving the recording paper either in the forward or rewind direction. This mechanism is under the selective control of push-buttons 5 on the panel 6*a* and may be of the type disclosed in application Serial No. 166,498, filed January 16, 1962 by R. S. Kampf, now Patent 3,145,578 of August 25, 1964.

Figure 3:
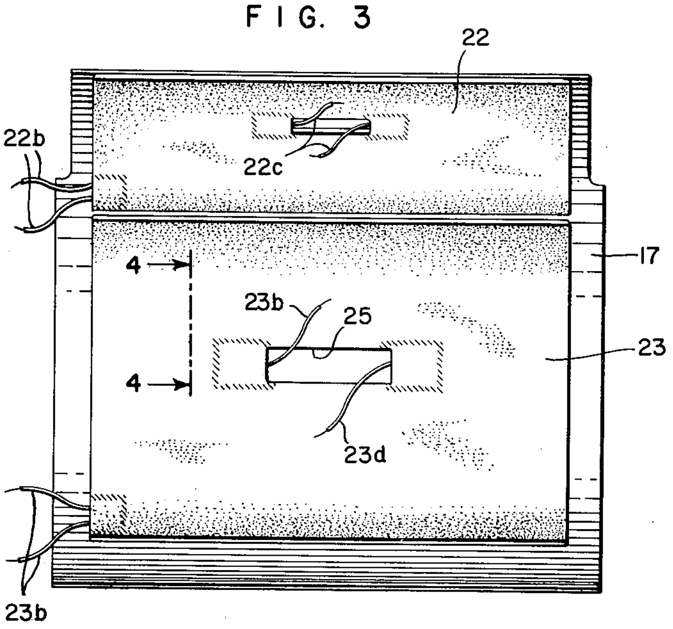
FIG. 3 is a detail view of the hot platen showing the two-piece pad-type heater construction thereof.

As seen particllarly in FIG. 3, two electrically energized pad-type heaters 22 and 23 are mounted in close thermal contact, as by cementing, or any other suitable fastening means, to the rear surface of platen 17. Heater 22 is disposed on the upper portion of platen 17 and heater 23 is disposed on the lower portion thereof. The electrical energization of each of the heaters is arranged to be separately regulated by means of the control circuitry illustrated in FIG. 5 whereby the upper portion of the platen 17 desirably may be controlled to a selected temperature which is different from the temperature to which the lower portion is controlled.

By way of illustration and not limitation, in an operating embodiment of the apparatus, the heater 22 was rated at 550 watts at 117 volts A.C. and provided an operating temperature of 220° F. The heater 23 was rated at 850 watts and at 117 volts A.C. and provided a maximum operation temperature of approximately 375° F.

Figure 5:
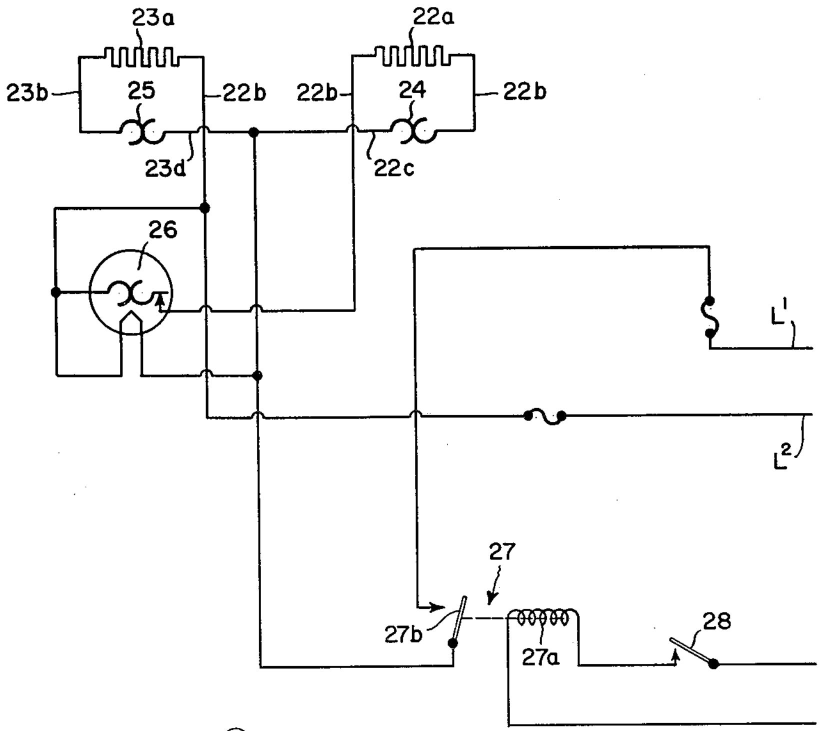
FIG. 5 illustrates the heater resistance and temperature control circuitry for the hot platen.

The control circuitry illustrated in FIG. 5 includes heater resistor elements 22*a* and 23*a* which are respectively associated with heater pads 22 and 23, adjustable thermostats 24 and 25 respectively associated with resistors 22*a* and 23*a*, a remote type adjustable thermostat 26 which is mounted on panel 6*b* and permits adjustment of the temperature at which the heater 22 heats the platen, and a relay 27 having a coil 27*a* and associated contacts 27*b* for permitting the platen heaters 22 and 23 to be energized only when the oscillograph is otherwise ready or desired to perform its desired recording functions. Specifically, the coil 27*a* is connected in the known manner into the operating circuitry of the oscillograph and thereby interlocks the operation of heaters with that of the other components of the oscillograph. Additionally, a switch 28 connected in the energizing circuit of relay coil 27*a* and manually operable from the front of the oscillograph by a push-button 28*a* on panel 6*a* is provided to permit ready connection and disconnection of the supply of electrical current to the heaters 22 and 23. Desirably, the transmission mechanism for driving the recording paper is interlocked with the platen heater control circuit to prevent rewinding of the recording paper while the platen heaters are energized. This prevents rewinding heated paper back on the supply reel.

Lamp 10 desirably is controlled by a starting switch and an on-off switch, neither of which is shown but which are actuable by a push-button 29 provided on the panel 6*a* on the front of the oscillograph.

The slots provided in the face of the platen 17 adjacent the recording paper 4 are provided to remove a boundary layer of air or gas which tends to adhere to the surface of the recording paper adjacent the hot surface of the platen. It is believed that such boundary layer of air or gas may result, at least in part, from the conversion of moisture in the recording paper to steam because of the heating of the recording paper. Such boundary layer tends to adhere to the side of the recording paper adjacent the platen. Unless removed, such boundary layer of air or gas would tend to prevent close thermal contact between the recording paper and the platen and thereby substantially reduce the heating of the recording paper for a given temperature of the platen. With the slots provided in the surface of the platen, as illustrated, such boundary gaseous layers, as introduced, are vented to the sides of the platen and are dissipated to the atmosphere. Because of the resulting close thermal contact between the recording paper and the platen, the over-all heat transfer between the platen and the recording paper is materially increased even though the surface area of the platen which is available for heat transfer is reduced to the extent that the slots are provided in the surface of the platen. It has been found, additionally, that the slots which are provided in the surface of the platen have a further advantagsous effect in minimizing the tendencies for the recording paper to wrinkle particularly at low recording speeds.

As noted hereinbefore, at higher writing and paper speeds, the recorded trace may not immediately be visible. During recording at such higher speeds, a latent image is created on the recording paper, which image appears after secondary exposure of the paper to radition, as described. The appearance of this latent image through secondary exposure has been termed "latensification." In the operative embodiment of the apparatus illustrated, the thermostats 24, 25 and 26 were so adjusted as to produce a temperature of approximately 230° F. in the region from immediately adjacent the recording plane to about a third of the way down along the length platen, and a temperature in the range of 130°–350° F. or slightly higher in the lower half or two-thirds of the platen. Consistent with practicality in the avoidance of scorching or otherwise damaging the paper, it has been found that the higher the temperature the better.

An important aspect of the present invention involves the discovery that by first simultaneously exposing the recording paper for a short time to heat in the range from 170° F. to 350° F., as described, and to a low intensity state of visible and ultra-violet radiations including wavelengths to which the recording paper is particularly sensitive, high intensity ultra-violet radiation embracing the same wavelengths of radiation may thereafter be used while the recording paper is so heated, to effect rapid latensification, without fogging, of the recording paper. Latensifier lamps 18 and 19 provide such additional radiations effecting this desired rapid latensification.

Each of the latensifier lamps 18 and 19, as illustrated in FIG. 1, includes two fluorescent tubes, one tube, designated 30, providing cool-white light and the other tube, designated 31, providing so-called black light or high intensity ultra-violet radiation. Tube 30 desirably may comprise a G.E. Type 14T8CW fluorescent lamp and tube 31 may comprise a G.E. Type F18T8BL fluorescent lamp.

For extremely rapid latensification, it is important for paper speeds from 2 to 8 inches per second, that the direct rays of the lamps 18 and 19 should not strike the recording paper 4 nearer than approximately one inch below the amber window 15, as seen in FIG. 1. At lower paper speeds the distance may be less than one inch. In this region from approximately one inch below the amber window, the recording paper should be exposed only to ambient or indirect light containing a low intensity of radiations to which the paper is particularly sensitive. At very high paper transport speeds, the interval may desirably be increased to about 2 or 3 inches. The so-called black light from tubes 31 should not strike the paper 4 until the latter has been exposed to ambient or indirect light, and additionally, has received the full intensity of the white light from tubes 30.

With this latensifier arrangement, the heat from platen 17 and the radiation from the ambient light and the cool white light tubes 30 serve to expose the recording paper 4 for a short time to a low intensity state of radiation. Such exposure has been found to inactivate the original recording sensitivity of the recording paper so as thereafter to permit rapid forced latensification of the latent image by high intensity ultra-violet radiation from the black light tubes 31. Thus, a high intensity latensifying radiation defining the same wavelengths to which the recording paper is sensitive for recording the deflections of the galvanometer beams effectively may be used for latensification of the latent recorded images or traces, with a minimum of fogging. The presence of visible light in the wavelength band from 5000 A. to 7000 A. in the cool white light is also useful for the purpose of viewing the record.

By way of example and not limitation, one form of recording paper 4 which has been found to be particularly useful in the practice of the present invention is the print-out material described in U.S. patent application Serial No. 93,289 filed by Troy A. Scott on March 2, 1961, and assigned to the assignee of the present invention. This form of recording paper is sold by the Heiland Division of the said assignee, and is identified as its part number A–304796.

Other recording papers which may also be used to advantage in the practice of this invention are the print-out materials made and sold by Eastman-Kodak Company and identified as its Kind 1591 and Kind 1592, and the print-out material made and sold by E. I. du Pont de Nemours & Company and identified as its Lino-Writ 5.

The print-out papers designated above have spectral sensitivities between 3000 A. and 5000 A. However, the wavelengths between 3000 A. and 4000 A. are most effective in producing traces, in desensitizing the background at low intensities in combination with the heating produced by the platen 17, and in latensifying latent images. While the wavelengths between 4000 A. and 5000 A. also contribute to these functions, they do so in a somewhat less efficient manner. The presence of wavelengths from 5000 A. to 20,000 A. during any portion of the rapid latensification procedures herein described augments the effects produced by the heated platen 17 in desensitizing the paper. The wavelengths between 5000 A. and 7000 A. are useful in viewing the record. Print-out papers which are desensitized by low intensity radiations also are found to have an extreme reciprocity failure at low intensities.

Using the latensifier method and apparatus, as described above, in combination with recording paper of the type described, it has been found that traces appear well within a small fraction of a second at paper speeds in excess of 8 inches per second at any resolvable frequency, and an envelope at non-resolvable frequencies.

It has been found that the contrast between trace and background decreases with increasing paper speed. This is believed to be due primarily to the fact that the latensification time is inversely proportional to the paper speed. That is to say, as the speed of travel of the paper downwardly over the heated platen increases, the time during which the paper is exposed to the heat of the platen and to the radiation emanating from lamps 18 and 19 correspondingly decreases. The background density does not behave in the same general manner as the trace contrast. The background density decreases, remains relatively constant, or increases with increasing paper speed. The decrease in background with increasing paper speed is due to the decrease in latensification time. The increase in background with increasing paper speeds is due to the fact that the hot platen exposure is not sufficient to desensitize the background. As the paper speed increases, the paper is exposed for a shorter time to the hot platen before the paper's exposure to the high intensity ultra-violet illumination from tubes 31. Thus, the background is more sensitive to the ultra-violet illumination at higher paper speeds than at lower paper speeds. Because the paper is hot, the photochemical reaction proceeds at a high rate. Thus, it is possible to obtain high background densities with the short latensification time at higher paper speeds. The increase in background density with paper speed also has been found to depend on the latensification time.

While the latensifier lamps 18 and 19 have been illustrated as showing a cool-white light tube 30 and a black light tube 31 as associated with a common reflector, it will be apparent to those skilled in the art that, if desired, each of the tubes 30 and 31 may be mounted in association with a separate and individual reflector, and arranged to provide a desired spacing or separation thereof along the length of the recording paper as it moves downwardly along the front face of the oscillograph.

Figure 6:
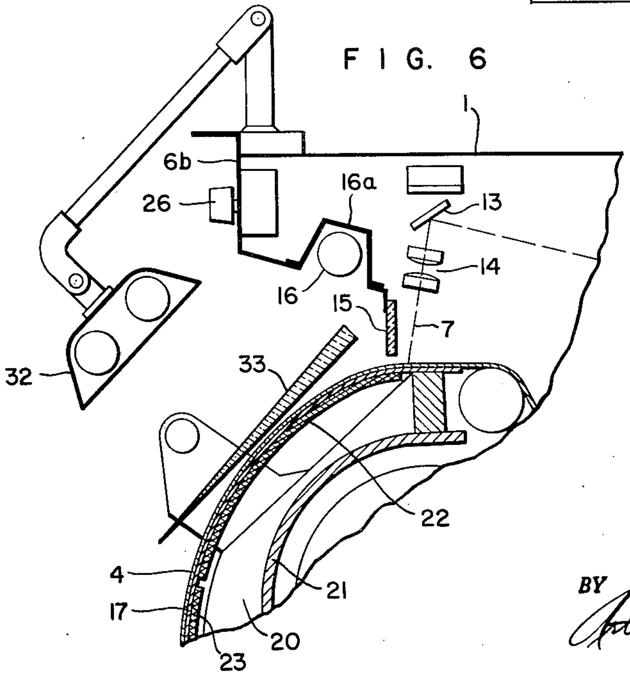
FIG. 6 illustrates a modified latensifier arrangement.

In the modified oscillograph latensifier arrangement illustrated in FIG. 6 a single latensifier lamp 32 which may be identical to either of the lamps 18 and 19 shown in FIG. 1 and contains a cool white and a black light tube, is supported at the top of the oscillograph in front of the exposed longitudinal section of the recording paper 4. As in the arrangement of FIG. 1, it is important that the direct rays of the lamp 32 should not strike the paper nearer than about one inch below the amber window 15. In the region between the lower edge of the amber window 15 and the position at which these direct rays from the lamp 32 strike the paper, the paper should be exposed to ambient or indirect light. At faster paper transport speeds, the interval between the lower edge of the amber window 15 and the line or region at which rays from the lamp 32 strike the paper may be increased to 2 or 3 inches.

If desired, a graduated optical wedge or filter 33 may be provided between the lamp 32 and the upper portion of the exposed paper 4. The filter 33 may be rectangular in shape and extends completely across the width of the recording paper 4, immediately below the amber window 15, and for a suitable distance along the length of the recording paper as the latter travels downwardly along the front face of the oscillograph. By way of example and not limitation, it is contemplated that the height of this filter may be one or two inches and so arranged that the intensity of radiation to which the paper is particularly sensitive passing through the filter and striking the recording paper progressively increases as the paper moves downwardly along the front of the oscillograph. When this filter 33 is employed, the tubes for lamp 32 may both comprise fluorescent tubes providing black light such as the fluorescent tubes 31 shown in FIG. 1, if desired.

With this modified arrangement, it is evident that the recording paper is exposed to a low intensity state of radiation for the short time interval during which the recording paper is shielded by the filter 33, and is thereafter directly exposed to the high intensity latensifying radiations emanating from the latensifier lamp 32 as the paper passes out from under the filter 33 and on downwardly along the front of the oscillograph.

It will be apparent from the foregoing description that there has been provided, according to the present invention, a novel method for effecting rapid trace latesification for providing extremely fast access to recorded information. The latesifying apparatus employing this method in operative rapidly to produce an image or trace of phenomena occurring at either low or high frequency, thereby making the image or trace quickly visible and usable in full view and under control of the operator and giving the operator quick access to the recorded information in a period of time significantly shorter than that obtainable by conventional processing techniques.

Subject matter disclosed but not specifically claimed herein is disclosed and claimed in the copending application of Roger D. Erickson, Serial No. 130,808, filed August 11, 1961, and in the copending application of Harold J. Brikowski, Serial No. 186,744, filed April 11, 1962.

What is claimed is:

The method of latesifying images which have been recorded on print-out material comprising the steps of heating said material bearing said images to a temperature as high as practical in the range of 170° F. to 400° F., and while so heated exposing said material initially and briefly to a low intensity state of radiation including wavelengths in the range of initial recording sensitivity of said material and thereafter to high intensity radiations defining substantially the same wavelengths.

References Cited by the Examiner

UNITED STATES PATENTS

| | | | |
|---|---|---|---|
| 3,143,940 | 8/1964 | Brown et al. | 95—1 |
| 3,144,332 | 8/1964 | Brown et al. | 96—27 |

OTHER REFERENCES

Photographic Science and Engineering: vol. 5, No. 1, Jan.–Feb., 1961; Article: An Investigation of Print-Out Paper, by John H. Jacobs. Copy in 346–109 in group 430.

LEYLAND M. MARTIN, *Primary Examiner.*